F. STONE.

CORE DRILL.

APPLICATION FILED FEB. 24, 1917.

Reissued Sept. 11, 1917.

14,356.

2 SHEETS—SHEET 1.

WITNESSES:

Charles Eckles

Thos. Castleing.

INVENTOR

Frederick Stone

BY Strong & Townsend

ATTORNEYS

F. STONE.

CORE DRILL.

APPLICATION FILED FEB. 24, 1917.

Reissued Sept. 11, 1917.

14,356.

2 SHEETS—SHEET 2.

WITNESSES:

Charles Rokes

Thos. Castberg.

INVENTOR

Frederick Stone.

BY Strong & Townsend

ATTORNEYS

UNITED STATES PATENT OFFICE.

FREDERICK STONE, OF SPOKANE, WASHINGTON, ASSIGNOR TO DIAMOND DRILL CONTRACTING COMPANY, OF SPOKANE, WASHINGTON, A CORPORATION.

CORE-DRILL.

14,356. Specification of Reissued Letters Patent. Reissued Sept. 11, 1917.

Original No. 761,332, dated May 31, 1904, Serial No. 168,153, filed August 4, 1903. Application for reissue filed February 24, 1917. Serial No. 150,656.

*To all whom it may concern:*

Be it known that I, FREDERICK STONE, a citizen of the United States, residing at Spokane, in the county of Spokane and State of Washington, have invented new and useful Improvements in Core-Drills, of which the following is a specification.

My invention relates to improvements in drilling apparatus of the type employed usually in prospecting for precious metals, coal, and the like and which is adapted in penetrating into the earth to remove a solid section or "core" of all strata passed through for the purpose of determining their depth and character.

It consists of the parts and the construction and operation of parts hereinafter more fully described, having reference to the accompanying drawings, in which—

Figure 1:
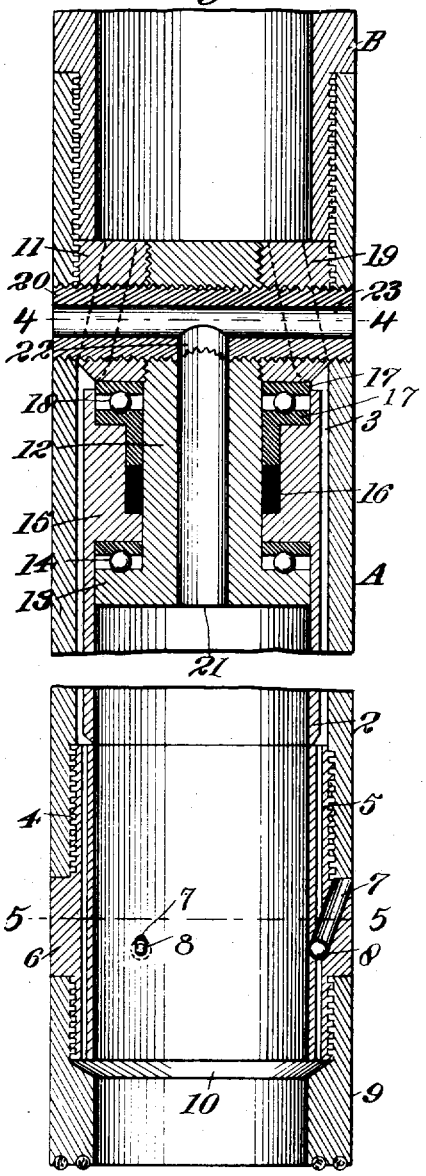
Figure 1 is a vertical central section of my invention.

A represents a core-barrel casing or shell adapted to be connected rigidly to and to be rotatable with the hollow drill-rod B, by which the drill is operated from the surface.

2 is the core-barrel, supported inside of and concentric with casing A and out of contact therewith, so as to leave an intervening space 3, through which water is fed to the point of the drill. The casing and core-barrel are of suitable length and diameter, dependent on the size of the core to be extracted and the nature of the formation encountered. Usually the drills are adapted to bore a hole from one and one-half to two or more inches in diameter and to remove a core from one to two or more inches thick, according to the size of the drill, and three to four or more feet in length.

4 is the core-lifter, screwing into the lower end of casing A and designed to abut against the end of the core-barrel, which latter does not extend quite the full length of the casing. The core-lifter comprises a cylindrical section with an annular series of holes 5 bored in its walls lengthwise of the section and communicating with the water-space 3 when the section is in position on the end of the casing.

The lifter has an annular thickened portion 6 intermediate of its threaded ends, in which are one or more (here shown three) holes, as 7, inclined downwardly and inwardly and in which the balls 8 are reciprocable. A ball is inserted into each hole 7 before the lifter is screwed into the casing, the end of the latter serving to close the upper ends of the holes and keep in the balls. The lower ends of the holes are slightly reduced to prevent the balls falling out, but still allowing them to project into the core-space to engage the sides of the core and insure its being drawn out with the drill when the latter is removed from the hole.

9 is an annular bit provided with an interior-threaded portion engaging the correspondingly-threaded lower end of the core-lifter and having a thickened lower portion with a central opening coincident and of approximately equal diameter with the opening in the core-barrel and lifter. The inner surface of the bit intermediate of the threaded portion and the reinforced portion is beveled, as at 10, to allow for water to pass outward and downward from the openings 5 in the lifter.

The bit is set with the usual "diamond" or carbon abrading members on its lower face and inner and outer edges.

As the bit is rotated and fed forward by the turning and advancement of the drill-rods and casing the diamonds chip and grind away the rock in an annular hole, leaving a solid cylindrical core intact in the center, which gradually passes up into the core-barrel. When the apparatus is drawn to the surface, the gravity-actuated balls 8 grip the core to cause it to be broken off and held in the barrel and carried out with it.

During the advancement of the drill into the rock the balls are normally retracted within the inclined holes, being pushed back by the core and giving free entry to the core within the barrel.

It is necessary in all diamond-core-drill work when the drill is in operation to force a current of water to the bottom of the hole in order to wash away the cuttings and keep the diamonds cool.

The drill-rod is of extra heavy pipe and is made in sections in suitable lengths, usually of five or ten feet, and put together with hollow steel couplings. The current of water is pumped through the drill-rod, core-barrel, and bit and returns to the surface outside of the casing and drill-rod sections.

The difficulty with the core-drills ordinarily in use is as follows, according as the drill is a single-tube drill or a so-called "double-tube" drill: In the single-tube drills the heavy pressure of the water column in the core-barrel and upon the core (except in very rare cases where the rock is solid and the core remains intact) forces the broken pieces of the core against the bit and diamonds and against the core-piece that is still unbroken from the solid rock, and the grinding and blocking of these pieces destroy a great percentage of core, which instead of coming up in the core-barrel when the rod is pulled up is washed up in the cuttings. This process in addition to destroying a considerable portion of the core is destructive of the diamonds, inasmuch as where the rock is hard and broken the water forces the small fragments to the bottom of the hole into contact with the inside diamonds, chipping and breaking them.

With the ordinary double-tube core-drill the core-barrel admits the water from the rod at a point adjacent to the bit, but returns it all to the surface, just as with the single-tube drill, beneath the bit and outside the shell and rod. The objection here is that on the drill being lowered into the hole and drilling operation commenced the core-barrel is filled with water under pressure of from seventy to eighty pounds or more per square inch, which acts as a cushion above the forming core to prevent the free progress of the core to the top of the barrel. The full pressure of the water being on the core near the bottom of the hole causes the broken pieces to bind and block and wear away the core and destroy the diamonds, as with the single-tube barrel.

Figure 3:
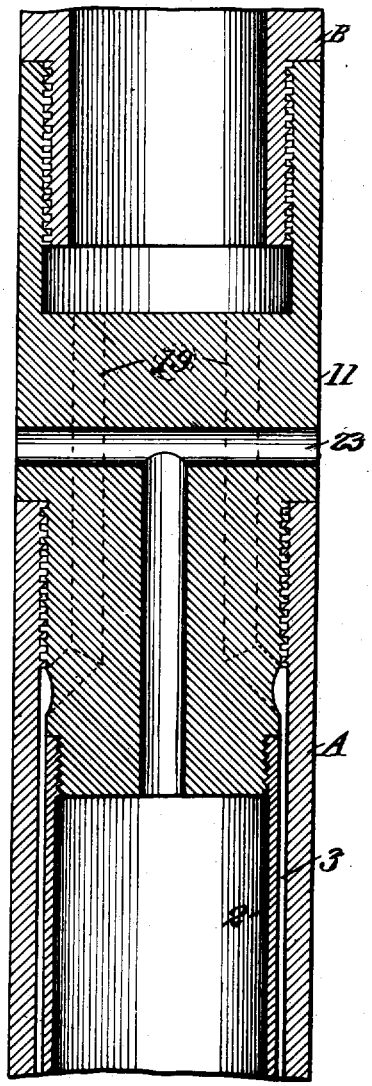
Fig. 3 is a vertical central section of a second modification.
Figure 4:
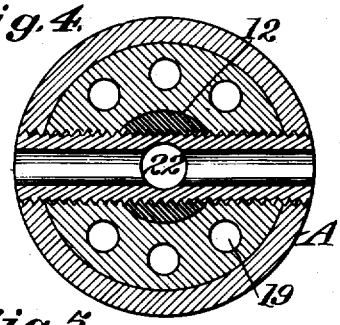
Fig. 4 is a transverse section on the line 4—4, Fig. 1.
Figure 5:
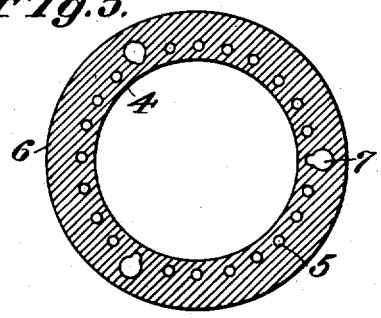
Fig. 5 is a transverse section on line 5—5, Fig. 1.
Figure 6:
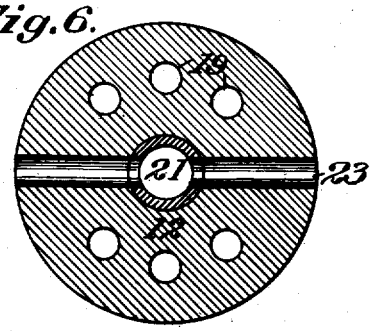
Fig. 6 is a transverse section on line 6—6, Fig. 2.
Figure 7:
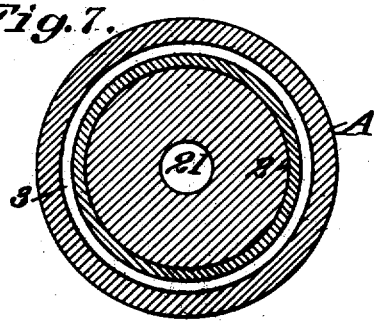
Fig. 7 is a transverse section on line 7—7, Fig. 2.

The main object of the present invention is to provide a core-barrel wherein a portion of the water entering the barrel above the bit will be returned to the surface through the core-barrel to assist rather than retard in the upward progress of the core and to prevent the broken pieces from wedging and grinding and to keep the bottom of the hole clear, and thus protect the diamonds.

Where these drills are to be used in drilling for salt or coal or other friable material, the core-barrel is designed to remain stationary relative to its casing which alone revolves. Such is the construction contemplated in Fig. 1. Fig. 3 shows a modification in which the shell and core-barrel are both rotatable. In either case the return water is divided and part returned beneath the bits and outside the shell and rod and part through the shell and outside the rod sections. This upward circulation of the water may be effected in a variety of ways. In the present instance I have shown the following means for admitting water from the rod to the space 3 and after delivering it to the core-barrel returning a portion of it thence through the upper part of the barrel and outside the rod to the surface.

A centrally-perforated plug 11 is screwed into the upper end of the shell A just below the point of attachment of the lower drill-rod section. This central perforation is screw-threaded to receive the threaded stud or hanger 12, which is to support the core-barrel. The stud 12 has a flange or head 13, which in Fig. 1 is shown as provided with an annular groove or race to accommodate a row of balls 14. The core-barrel is formed with an interior annular projection 15, adapted to embrace the stud. Between the latter and projection 15 is interposed a bearing-plate having an annular groove on its under side corresponding with the groove in head 13 to receive the balls 14, which thus support the core-barrel. A suitable packing 16 affords a water-tight joint between the part 15 and the stud and at the same time does not prevent the stud turning relative to the core-barrel.

Between the lower end of plug 11 and the upper end of the core-barrel are interposed the annular bearing plates or boxes 17—17′, carrying a second supporting row of balls 18.

The space above plug 11 is in communication with space 3 below through a series of inclined ports 19.

The shell A, the plug 11, and the stud or hanger 12 are perforated coincidently and correspondingly threaded to receive a threaded centrally-perforated plug 20, whose outer ends are flush with the sides of the shell. The portion of hanger 12 between its head and the perforation made for the reception of the horizontal plug 20 is centrally perforated, as at 21, while plug 20 has a perforation 22, adapted to register with passage-way 21 and forming the communication between the latter and the horizontal passage-way 23 of plug 20. Thus water may pass from the rod through ports 19 down into space 3 between the shell and core-barrel, thence through holes 5 in the core-lifter into the core-barrel just above the bit. Here part of the water passes down around the bit and up outside the shell and rod. The rest finds its way up between the core and the inside of the core-barrel to the top of the barrel, whence it passes through passage-way 21 of the hanger, through the radial opening 22 in plug 20 into the longitudinal passage-way 23 of plug 20, and thence discharges from opposite sides of the shell and passes up finally to the surface outside the drill-rod sections.

Figure 2:
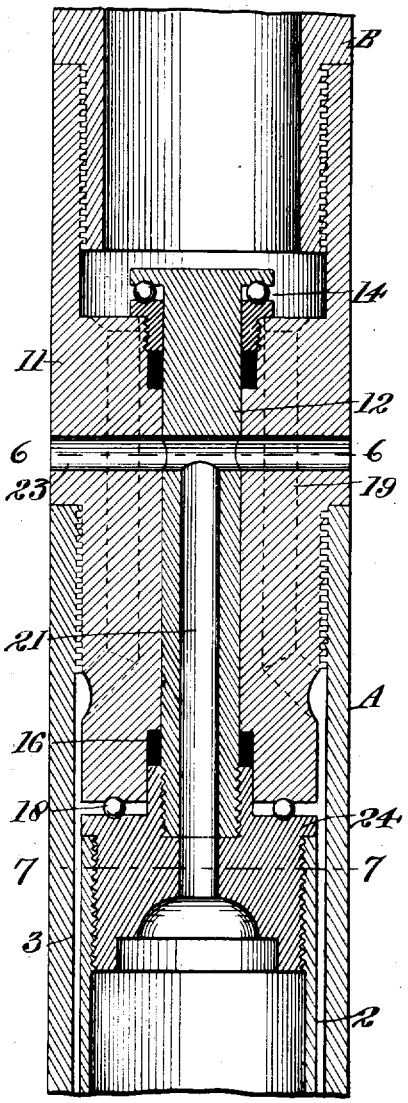
Fig. 2 is a vertical central section of a modification.

In Fig. 2 is shown a modified form of connection for a non-rotatable core-barrel. In this case the plug 11 screws onto the end of rod B and the shell A screws on rigidly to the plug. The plug has a longitudinal perforation to receive the hanger-pin 12, which here is shown with its head end uppermost and supported on the balls 14. The hanger-pin is perforated, as at 21, for a portion of its length and has lateral perforations registering with the transverse perforations 23 in plug 11. A perforated cap 24 screws onto the lower end of the hanger-pin 12, and a row of balls 18 is interposed between cap 24 and the adjacent end of plug 11. Suitable packing 16 is provided to prevent leakage between the rotatable part 11 and the non-rotatable hanger. The core-barrel 2 is carried by cap 24. Water passes from the space above the connection 11 through cored passages 19 into the annular space 3 between the shell and core, passes into the core-barrel, and part returns to the surface through passages 21 and 23 and exteriorly to the shell and pump-rod.

Having thus described my invention what I claim and desire to secure by Letters Patent is—

1. In a core drill, the combination of a hollow drill rod, a core-barrel shell and a plug member at the upper end of the core-barrel shell, a core-barrel supported by the plug member within and spaced from the core-barrel shell, water connections in the plug member for the downward passage of water from the drill rod to the space between the core-barrel shell and core-barrel, and return water connections in the plug communicating with the top of the core-barrel and having their outlets extending through the circumferential wall of the plug member to the exterior of the drill.

2. In a core-drill, the combination of a hollow drill rod, a plug member, a core-barrel shell extending below the lower end of the plug member, a core-barrel carried by the plug member within and spaced from the shell, an annular bit on the core-barrel shell, water connections from the drill rod through the plug to the space between the core-barrel and shell, and a return water connection from the top of the core barrel extending laterally within and through the circumferential wall of the plug member to the exterior of the drill.

3. In a drill of the character described, the combination with a rotatable, hollow rod and a shell rigid therewith, of a concentric inner core barrel, means for delivering water from the rod into the shell and from the shell into the lower end of the core-barrel, and return water connections for discharging water from the top of the core-barrel exterior to the said rod, said water connections including a plug member interposed at the lower end of the rod, and having said return water connections lying entirely within and extending through its circumferential wall to the exterior of the drill.

4. In a drill of the character described, the combination with a rotatable shell of a concentric inner core-barrel and means for supporting said barrel within the shell, said means including a central hanger rigidly connected with the shell, and means upon the core-barrel engaging with said hanger, said hanger having passage-ways extending laterally through the circumferential wall and communicating with the space exterior to the shell and with the interior of the core-barrel.

5. In a drill of the character described the combination with a shell, of a concentric inner core-barrel, and means for supporting the latter within the shell, said means including a perforated plug as 11 secured in the shell above the core-barrel, a hanger rigid with the plug and having a water-passage extending laterally through the circumferential wall of the hanger and plug and connecting the space in the top of the core-barrel with the outside of the shell, an internal projection on the core-barrel engaging said hanger, and antifrictional ball-bearings supporting the barrel on the hanger.

In testimony whereof I have hereunto set my hand.

FREDERICK STONE.